United States Patent
Olia et al.

(10) Patent No.: US 10,260,784 B2
(45) Date of Patent: Apr. 16, 2019

(54) SYSTEM AND METHOD FOR EVAPORATOR OUTLET TEMPERATURE CONTROL

(71) Applicant: General Electric Technology GmbH, Baden (CH)

(72) Inventors: Herbert Olia, Zurich (CH); Suresh K. Shenoy, Johns Creek, GA (US); Jeffrey Magee, Longmeadow, MA (US)

(73) Assignee: General Electric Company, Schenectady, NY (US)

( * ) Notice: Subject to any disclaimer, the term of this patent is extended or adjusted under 35 U.S.C. 154(b) by 1076 days.

(21) Appl. No.: 14/139,483

(22) Filed: Dec. 23, 2013

(65) Prior Publication Data

US 2015/0176878 A1 Jun. 25, 2015

(51) Int. Cl.
| | |
|---|---|
| F25B 41/04 | (2006.01) |
| F25B 39/02 | (2006.01) |
| G05D 23/19 | (2006.01) |
| F22B 35/10 | (2006.01) |

(52) U.S. Cl.
CPC ........... *F25B 39/02* (2013.01); *F22B 35/102* (2013.01); *F22B 35/108* (2013.01); *G05D 23/1934* (2013.01)

(58) Field of Classification Search
CPC ...... F25B 39/02; F25B 35/108; F25B 35/102; G05D 23/1934
See application file for complete search history.

(56) References Cited

U.S. PATENT DOCUMENTS

| 3,390,540 A | * | 7/1968 | Brush ................. F25B 5/02 62/200 |
| 4,501,126 A | * | 2/1985 | Norton ................. F25B 5/02 417/313 |
| 4,829,777 A | * | 5/1989 | Matsuoka ........... F25B 49/005 62/149 |
| 5,007,245 A | * | 4/1991 | Defenbaugh ........... F25B 5/02 62/117 |
| 5,809,943 A | | 9/1998 | Olia |

(Continued)

FOREIGN PATENT DOCUMENTS

| CN | 101644502 A | 2/2010 |
| CN | 102207320 A | 10/2011 |

(Continued)

OTHER PUBLICATIONS

Nobuo et al., Control Device of Air Conditioner, May 19, 2011, JP2011099587A, Whole Document.*

(Continued)

*Primary Examiner* — Larry L Furdge
(74) *Attorney, Agent, or Firm* — Peter A. Flynn (57) ABSTRACT

Exemplary embodiments are directed to systems and methods for controlling an outlet temperature of an evaporator having a plurality of evaporator tube bundles, in which a processor is configured to compute an outlet temperature setpoint for the evaporator based on outlet temperatures of each of the plurality of evaporator tube bundles. The processor also regulates fluid flow through at least one of the evaporator tube bundles to reduce deviation between the outlet temperature of the evaporator and the outlet temperature setpoint for the evaporator.

11 Claims, 4 Drawing Sheets

(56) References Cited

U.S. PATENT DOCUMENTS

| | | | |
|---|---|---|---|
| 2009/0013700 A1* | 1/2009 | Unezaki | F25B 9/008 62/77 |
| 2010/0324742 A1 | 12/2010 | Huerta-Ochoa | |
| 2012/0040299 A1 | 2/2012 | Beveridge | |
| 2013/0180474 A1 | 7/2013 | Wilhelm et al. | |

FOREIGN PATENT DOCUMENTS

| | | | |
|---|---|---|---|
| CN | 102322671 A | | 1/2012 |
| JP | H1038398 A | * | 2/1998 |
| JP | 2006336947 A | * | 12/2006 |
| JP | 2011099587 A | * | 5/2011 |

OTHER PUBLICATIONS

Kusumaru et al., Refrigerating Cycle Device,Dec. 14, 2006, JP2006336947A, Whole Document.*
Ueno, Controller of Electric Expansion Valve, Feb. 13, 1998, JPH1038398A, Whole Document.*
Notification of Transmittal of the International Search Report (Forms PCT/ISA/220 and Forms PCT/ISA/210) and the Written Opinion of the International Searching Authority (Forms PCT/ISA/237) dated Apr. 1, 2015, by the European Patent Office in corresponding International Application No. PCT/EP2014/074850. (8 pages).
Machine translation and Office Action issued in connection with Corresponding CN Application No. 201480070641.2 dated May 2, 2017.

\* cited by examiner

SYSTEM AND METHOD FOR EVAPORATOR OUTLET TEMPERATURE CONTROL

FIELD

The disclosure is related to controlling the outlet temperature of an evaporator, and particularly to controlling the outlet temperature of an evaporator having a plurality of evaporator tube bundles.

BACKGROUND

In known plant engineering systems, control of the temperature at the outlet evaporator has led to steam evaporator designed to include a plurality of evaporator tube bundles. A known method of controlling the temperature at the outlet of the evaporator involves measuring the flow through each evaporator tube bundle individually, then separately controlling control the flow through each bundle to obtain the desired outlet temperature. In theory, this process provides adequate temperature control. However, in practice the system can be complex and expensive to maintain as the number of sensors and the amount of data collected and processed is high.

SUMMARY

An exemplary method for controlling an outlet temperature of an evaporator having a plurality of evaporator tube bundles is disclosed, the method comprising: computing an outlet temperature setpoint for the evaporator based on outlet temperatures of each of the plurality of evaporator tube bundles; and regulating fluid flow through at least one of the evaporator tube bundles to reduce deviation between the outlet temperature of the evaporator and the outlet temperature setpoint for the evaporator.

An exemplary method for controlling an outlet temperature of an evaporator having a plurality of evaporator tube bundles is disclosed, comprising: receiving a measured outlet temperature of each evaporator tube bundle; computing an outlet temperature setpoint of the evaporator based on the measured outlet temperatures; comparing an outlet temperature of each evaporator tube bundle to a highest outlet temperature among the plurality of evaporator bundles; and computing an adjusted outlet temperature setpoint for each evaporator tube bundle by adding a delta value resulting from the comparing to the outlet temperature setpoint.

An exemplary system for controlling an outlet temperature of an evaporator having a plurality of evaporator tube bundles is disclosed, the system comprising: a controller having a memory for non-transitory storing a computer program which will configure the controller to compute an outlet temperature setpoint for evaporator tube bundles based on measured outlet temperatures of the evaporator tube bundles, and to position a control valve of at least one evaporator tube bundle based on a respective delta value between an outlet temperature setpoint of the evaporator and a measured outlet temperature of the at least one evaporator tube bundle.

An exemplary controller for controlling an outlet temperature of an evaporator having a plurality of evaporator tube bundles is disclosed, the controller comprising: a processor having a memory for non-transitory storing a computer program which will configure the processor to compute an outlet temperature setpoint for an evaporator based on outlet temperatures of each of plural evaporator tube bundles, and to regulate fluid flow through at least one of the evaporator tube bundles to reduce deviation between the outlet temperature of the at least one evaporator tube bundle and the outlet temperature setpoint of the evaporator.

An exemplary computer readable medium is disclosed for non-transitory storing of program code for causing a computer to execute a method comprising: computing an outlet temperature setpoint for an evaporator based on outlet temperatures of each of plural evaporator tube bundles; and regulating fluid flow through at least one of the evaporator tube bundles to reduce deviation between the outlet temperature of the at least one evaporator tube bundle and the outlet temperature setpoint of the evaporator.

BRIEF DESCRIPTION OF THE DRAWINGS

In the following the disclosure will be described in greater detail by means of exemplary embodiments with reference to the accompanying drawings, in which.

DETAILED DESCRIPTION

Exemplary embodiments of the present disclosure are directed to systems and methods for controlling an outlet temperature of an evaporator having a plurality of evaporator tube bundles or sections. In particular, the exemplary embodiments disclosed herein can substantially reduce and/or eliminate the disparity in temperatures across the outlets of the plurality of evaporator tube bundles. In addition, the temperature within each evaporator tube bundle can be controlled so that differences in temperature across the height of the tube stacks is small. By keeping the temperature differences at the outlets of the plurality of evaporator tube bundles small, a relative constant temperature across the length of the outlet header can be maintained. Furthermore, controlling the temperature in this manner, reduces the mechanical stress on the evaporator outlet header.

Figure 1:
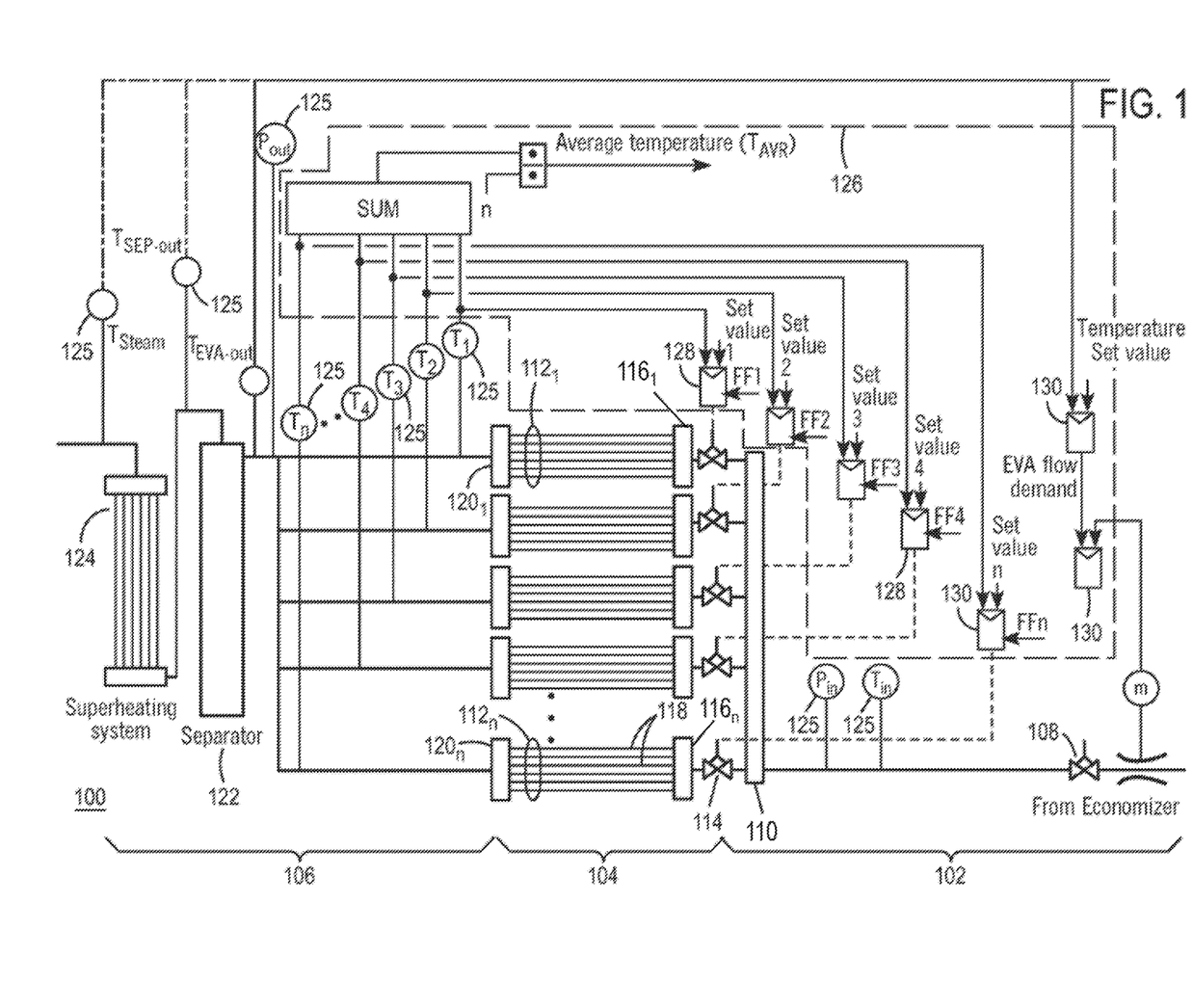
FIG. 1 illustrates an overview of an evaporator in accordance with an exemplary embodiment of the present disclosure.

FIG. 1 illustrates an overview of a once-through evaporator in accordance with an exemplary embodiment of the present disclosure.

The evaporator system 100 is configured to receive feed water from an economizer (not shown) and output superheated steam to a steam turbine (not shown). As shown in FIG. 1, the evaporator system 100 includes an inlet 102, an evaporator section 104, and an outlet 106. The inlet 102 includes a main control valve ($CV_M$) 108 that regulates the total flow of feed water through the evaporator system 100. A main inlet header 110 is located downstream of $CV_M$ 108 and distributes the feed water to the evaporator section 104. The evaporator section 104 includes a plurality of evaporator tube bundles $112_1$ to $112_n$. Each evaporator tube bundle $112_n$ includes a stack of evaporator tubes $118_{T_y}$ arranged in parallel between an inlet header $116_n$ and an outlet header $120_n$. In accordance with exemplary embodiments of the present disclosure, the number (y) of the evaporator tubes $118_{Ty}$ in each evaporator tube bundle $112_n$ is selected such that the temperature of an evaporator tube $118_{T1}$ at the top of the stack is substantially the same as the evaporator tube $118_{Ty}$ at the bottom of the stack. The inlet header $116_n$ of each evaporator tube bundle $112_n$ is connected downstream of a control valve ($CV_{ET}$) 114. Each $CV_{ET}$ 114 regulates the flow of feed water from the main inlet header 110 of the evaporator to the associated evaporator tube bundle $112_n$.

The outlet 106 of the evaporator section 104 is a combined flow of each evaporator tube bundle 112 to $112_n$. The flow from the outlet 106 is provided to a separator 122. Steam resulting from the separation process of the separator 122 is provided to an inlet of a superheating system 124. Superheated steam can be provided at an outlet of the superheating system 124 for use by a steam turbine (not shown).

As shown in FIG. 1, a plurality of sensors 125 are provided to obtain various temperature and pressure measurements from the evaporator 100. For example, sensors $125_{T1-Tn}$ can be provided to measure the temperature at the outlet of each evaporator tube bundle 112. Furthermore, sensors ($125_{TSEP-out}$, $125_{Tsteam}$) can be provided to measure the outlet temperatures at the separator 122 and the superheating system 124. In addition, sensors ($125_{Tin}$, $125_{Pin}$, $125_{TEVA-out}$, $125_{Pout}$) can be provided to measure temperature and pressure upstream (e.g., at least a location between the main inlet header 110 and the main control valve 108) of the main inlet header 110 and immediately downstream (e.g., at a location between the outlet 106 and the inlet of the separator 122) of the outlet 106 of the evaporator.

The evaporator system 100 also includes a processor 126. The processor 126 receives an output of each of the plurality of sensors 125. For example, the processor 126 can receive a measured outlet temperature $T_1$-$T_n$ of each evaporator tube bundle $112_1$ to $112_n$, an evaporator outlet temperature $T_{out}$, a steam outlet temperature $T_{SEP-OUT}$ of the separator 122, a steam outlet temperature $T_{STEAM}$ of the superheating steam system 124, an inlet temperature $T_{in}$, an inlet pressure $P_{in}$ of flow immediately upstream (e.g., at a location between the main inlet header 110 and the main control valve 108 of the evaporator 100) of the main inlet header 110 of the evaporator 100, and an output pressure $P_{EVA-OUT}$ of the evaporator 100. The measured values can be stored in resident memory of the processor 126 and/or in an external memory device as desired.

The processor 126 can be configured to include a plurality of controllers 128 for controlling the position of one of the control valves $114_1$-$114_n$ of the evaporator tube bundles $112_1$ to $112_n$. The processor 126 can also include a main controller 130 for controlling the position of the main control valve 108 of the evaporator system 100. In accordance with an exemplary embodiment of the present disclosure, the processor 126 can be configured to compute an outlet temperature setpoint $T_{EVA-SET}$ for the evaporator 100 based on measured outlet temperatures $T_1$-$T_n$ of the plurality of evaporator tube bundles $112_1$ to $112_n$ and position or regulate the position of a control valve ($114_n$) of at least one of the plurality of evaporator tube bundles $112_1$ to $112_n$ based on a respective delta value between the outlet temperature setpoint of the evaporator section 104 and the measured outlet temperature of the at least one evaporator tube bundle $112_n$. The processor 126 can regulate the position of the control valve $114_n$ of at least one of the evaporator tube bundles $112_n$ so that a small deviation (e.g., $\Delta T \leq ?$) between the outlet temperature $T_n$ of the evaporator tube bundles $112_n$ and the outlet temperature setpoint $T_{EVA-SET}$ of the evaporator section 104 can be realized. The outlet temperature setpoint $T_{EVA-SET}$ of the evaporator section 104 is computed as an average ($T_{AVR}$) of the measured outlet temperatures $T_1$ to $T_n$ of the plurality of evaporator tube bundles $112_1$ to $112_n$.

Figure 2:
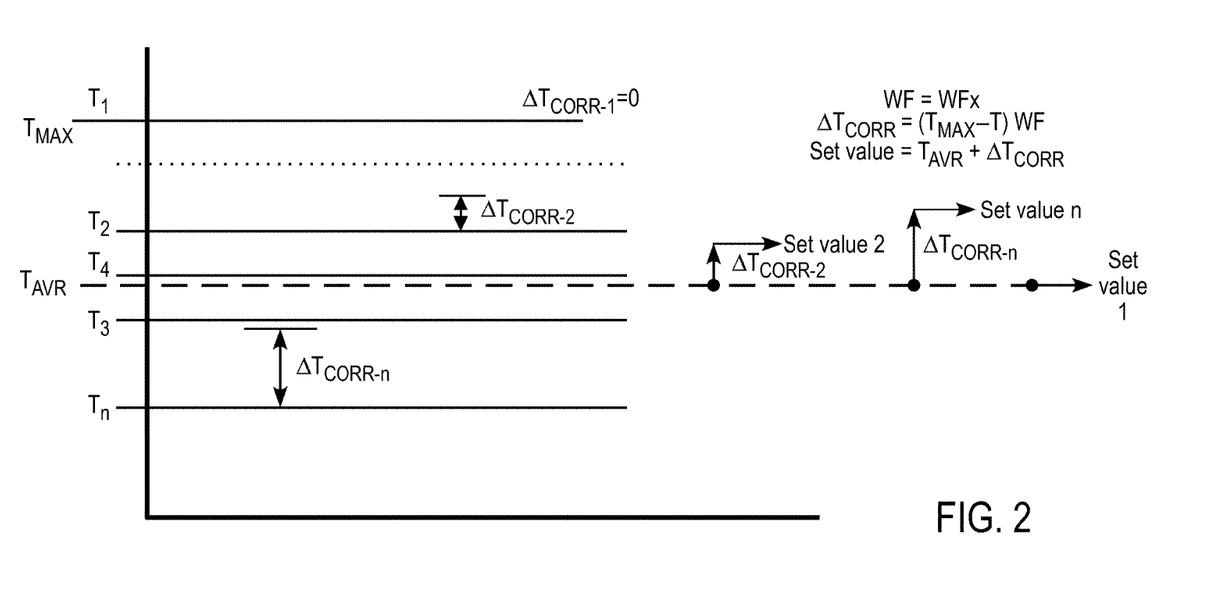
FIG. 2 is a graph illustrating an adjustment of the outlet temperature setpoint of the evaporator in accordance with an exemplary embodiment of the present disclosure.

FIG. 2 is a graph illustrating an adjustment of the outlet temperature setpoint of the evaporator in accordance with an exemplary embodiment of the present disclosure.

The processor 126 adjusts the position of a control valve $114_n$ of at least one of the plurality of evaporator tube bundles $112_n$ by adjusting the outlet temperature setpoint $T_{EVA-SET}$ of the evaporator section 104 with respect to the measured outlet temperature $T_n$ of the at least one evaporator tube bundle $112_n$ to obtain an outlet temperature setpoint $T_{BUNDLE-SET-n}$ for the at least one evaporator tube bundle $112_n$. In an exemplary embodiment, the processor 126 compares the measured outlet temperature $T_n$ of the at least one evaporator tube bundle $112_n$ to a highest measured outlet temperature ($T_{MAX}$) among the plurality of evaporator tube bundles $112_1$ to $112_n$. The delta value or correction value $\Delta T_{CORR-n}$ resulting from the comparison is added to the outlet temperature setpoint $T_{EVA-SET}$ (or $T_{AVR}$) of the evaporator section 104. Because the highest measured outlet temperature ($T_{MAX}$) is a temperature value among the plurality of evaporator tube bundles $112_1$ to $112_n$ that is higher than the outlet temperature setpoint $T_{EVA-SET}$ of the evaporator section 104, adjusting the outlet temperature $T_n$ of each evaporator tube bundle $112_1$ to $112_n$ as described to obtain corresponding outlet temperature setpoint $T_{BUNDLE-SET-n}$ of each evaporator tube bundle $112_n$, ensures that the deviation between the outlet temperature of each evaporator tube bundle and outlet temperature setpoint $T_{EVA-SET}$ of the evaporator section 104 is small and the highest outlet temperature setpoint is reduced.

Based on the adjusted temperature setpoint associated with each evaporator tube bundle $112_1$ to $112_n$, the processor 126 generates a respective control signal for positioning the control valve $114_n$ of the at least one evaporator tube bundle $112_n$. For example, if the adjusted temperature setpoint $T_{BUNDLE-SET-n}$ associated with one of the evaporator tube bundles $112_n$ is an increase from the previous temperature value, the control valve $114_n$ is adjusted to a more closed position to restrict the flow through the evaporator tube bundle $112_n$. On the other hand, if the adjusted temperature setpoint $T_{BUNDLE-SET-n}$ associated with one of the evaporator tube bundles $112_n$ is a decrease from the previous temperature value, the control valve $114_n$ is adjusted to a more open position to expand the flow through the evaporator tube bundle $112_n$.

Figure 3:
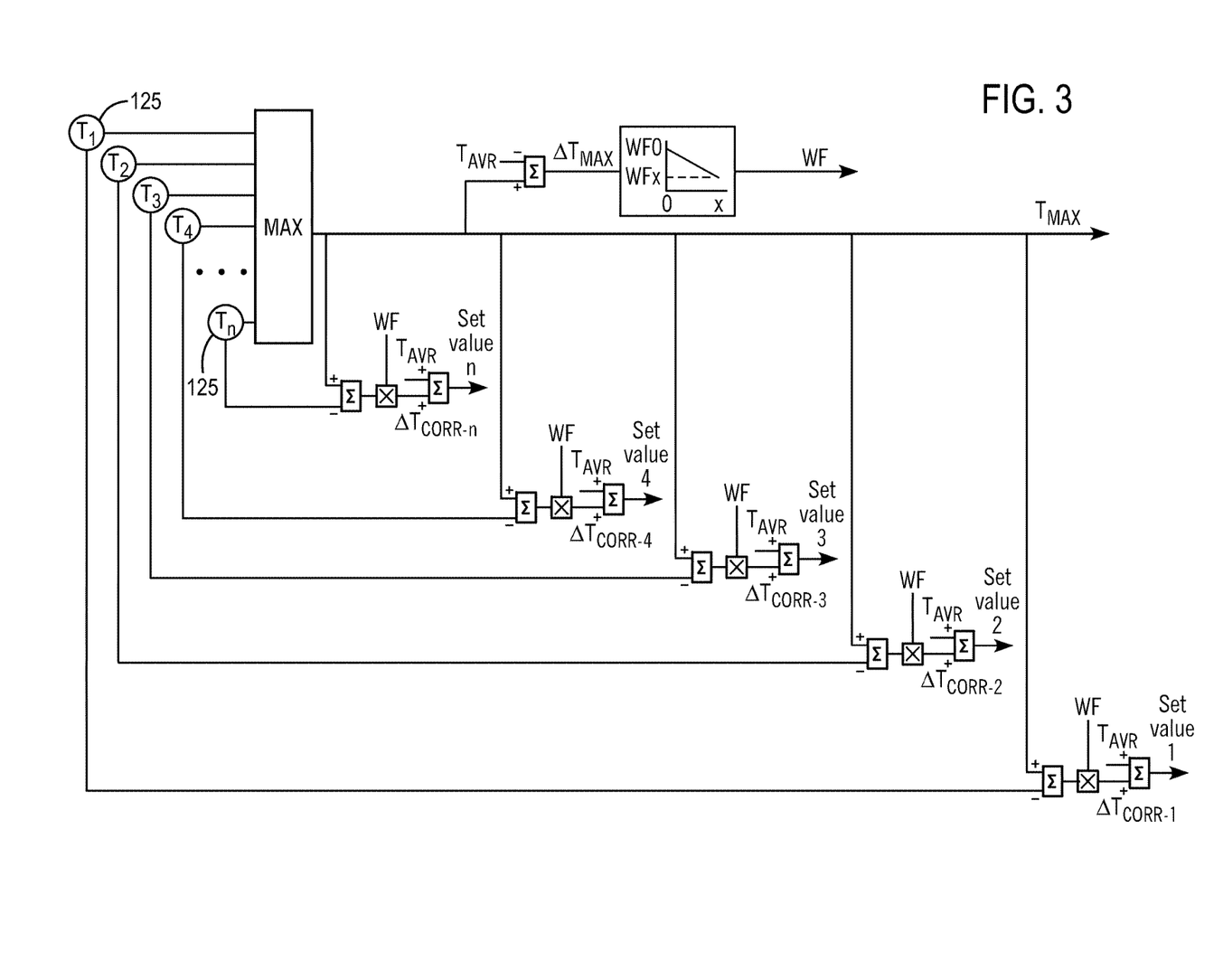
FIG. 3 is a diagram illustrating a process configuration of the processor in accordance with an exemplary embodiment of the present disclosure.

FIG. 3 is a diagram illustrating a process configuration of the processor in accordance with an exemplary embodiment of the present disclosure. As shown in FIG. 3, the processor 126 is configured to include control logic for determining the highest measured outlet temperature $T_{MAX}$ among the plurality of evaporator tube bundles $112_1$ to $112_n$. Once $T_{MAX}$ is obtained, the processor 126 can compute the adjust the outlet temperature $T_n$ of each evaporator tube bundle $112n$ to obtain a corresponding outlet temperature setpoint $T_{BUNDLE-SET-n}$ for each of the evaporator tube bundles $112_1$ to $112_n$ as described above.

Stability of the control system is a known concern in plant engineering systems that encounter the occurrence of transients and/or other large changes or fluctuations in a process. In accordance with an exemplary embodiment of the present disclosure, an amplification factor WF can be used to maintain stability in the control system when the position of a control valve is specified. As shown in FIG. 2, the processor 126 can be configured to multiply the correction value $\Delta T_{CORR}$ by an amplification factor WF. An inset graph provided in FIG. 3 shows that the amplification factor WF is inversely proportional to the amount of travel x between position changes in the control valve $114_n$. For example, if a large difference exists between the highest measured outlet temperature ($T_{MAX}$) among the plurality of evaporator tube bundles $112_1$ to $112_n$ and the outlet temperature setpoint $T_{EVA-SET}$ (or $T_{AVR}$) of the evaporator 100, then the valve must be controlled to move quickly over a large distance. This type of movement can destabilize the system such that a WF<<1 is multiplied by the correction value to provide stabilization. On the other hand, if small difference exists between the highest measured outlet temperature ($T_{MAX}$) among the plurality of evaporator tube bundles $112_1$ to $112_n$ and the outlet temperature setpoint $T_{EVA-SET}$ (or $T_{AVR}$) of the evaporator 100, then the valve must be controlled to move quickly over a smaller distance such that value of WF closer to or equal to 1 is preferred. A table of amplification factors can be stored in memory and accessed or selected by the processor 126 upon determination of the correction factor $\Delta T_{CORR}$.

Figure 4:
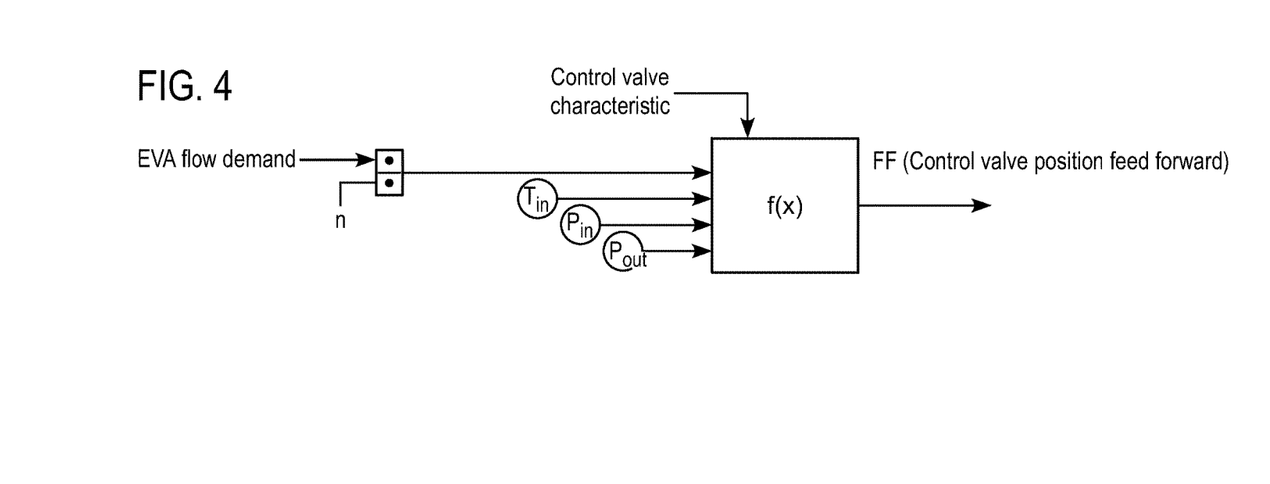
FIG. 4 is a diagram of control logic for positioning the control valves of the evaporator tube bundles in accordance with an exemplary embodiment of the present disclosure.

FIG. 4 is a diagram of control logic for positioning the control valves of the evaporator tube bundles in accordance with an exemplary embodiment of the present disclosure.

The processor 126 is configured execute control logic to determine a position of the control valves $114_1$ to $114_n$ of the plurality of evaporator tube bundles $112_1$ to $112_n$. As shown in FIG. 4, the processor 126 generates a feed-forward control signal ($FF_n$) to establish an initial position of a control valve $114_n$ of the at least one evaporator bundle $112_n$. The control signal $FF_n$ is generated as a function of at least one of inlet temperature $T_{in}$ and inlet pressure $P_{in}$ of flow at the main inlet header 110 of the evaporator 100, an output pressure $P_{EVA-OUT}$ of the evaporator system 100, a characteristic of the at least one control valve $114_n$, and a ratio of a total flow demand of the evaporator $EVAFLOW_{TOT}$ to a total number (n) of evaporator tube bundles. It should be understood that each control valve $114_1$ to $114_n$ can have unique characteristics that specify properties and/or an operational capacity of the respective control valve. By virtue of knowing the position of a control valve $114_n$ and the total flow demand of the evaporator $EVAFLOW_{TOT}$, the flow through the evaporator tube bundle $112_n$ can be determined through known computations. As shown in FIG. 1, the processor 126 is configured to distribute the computed control signals $FF_1$ to $FF_n$ to the tube bundle controllers $128_1$ $128_n$, respectively.

According to an exemplary embodiment of the present disclosure, the processor 126 can be configured to regulate the flow of fluid (e.g., feed water from the economizer (not shown)) through the evaporator section 101 based on one of the measured system values including an evaporator outlet temperature $T_{out}$, a steam outlet temperature $T_{SEP-OUT}$ of the separator 122, and an steam outlet temperature $T_{STEAM}$ of the superheating steam system 124. As shown in FIG. 1, at least one of the measured values ($T_{OUT}$, $T_{SEP-OUT}$, $T_{STEAM}$) is provided to the main valve controller 130 of the processor 126. In a first step, the main valve controller 130 compares the outlet temperature setpoint $T_{EVA-SET}$ (or $T_{AVR}$) of the evaporator 100 to one of the measured values ($T_{OUT}$, $T_{SEP-OUT}$, $T_{STEAM}$) to calculate the total flow demand of the evaporator $EVA-FLOW_{TOT}$. Next, the total flow demand of the evaporator $EVA-FLOW_{TOT}$ is compared to a measurement of the main flow from the economizer (not shown) to determine an appropriate position of the main control valve for the flow demand.

Figure 5:
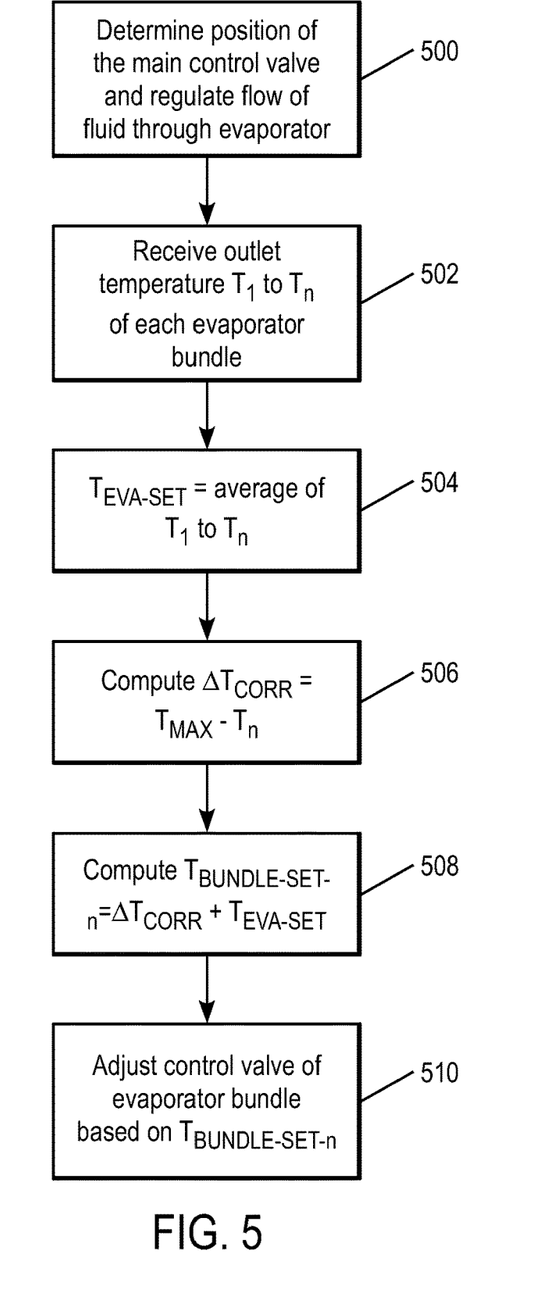
FIG. 5 illustrates a process for temperature control in an evaporator in accordance with an exemplary embodiment of the present disclosure.

FIG. 5 illustrates a process for temperature control in an evaporator in accordance with an exemplary embodiment of the present disclosure. According to exemplary embodiments of the present disclosure, the temperature control process is a continuous process that can be initiated following system startup, a system fault, or other suitable plant engineering or system event as desired. The processor 126 can be any known general purpose processor or integrated circuit such as a central processing unit (CPU), microprocessor, field programmable gate array (FPGA), Application Specific Integrated Circuit (ASIC), or other suitable programmable processing or computing device or circuit as desired. The processor 126 can be configured to include and perform features of the exemplary embodiments of the present disclosure through program code encoded or recorded thereon, or stored in a non-volatile memory device, such as Read-Only Memory (ROM), erasable programmable read-only memory (EPROM), or other suitable memory device or circuit as desired. In an exemplary embodiment, the program code can be recorded on a non-transitory computer readable medium, such as Magnetic Storage Media (e.g. hard disks, floppy discs, or magnetic tape), optical media (e.g., any type of compact disc (CD), or any type of digital video disc (DVD), or other compatible non-volatile memory device as desired) and downloaded to the processor for execution as desired, when the computer readable medium is placed in communicable contact with the processor.

In step 500, the processor 126 determines an initial position of the control valve and regulates the flow of fluid (e.g., feed water from the economizer (not shown)) through the evaporator 100 based on one of the measured values including an evaporator outlet temperature $T_{out}$, a steam outlet temperature $T_{SEP-OUT}$ of the separator 122, and an steam outlet temperature $T_{STEAM}$ of the superheating steam system 124. The processor 126 uses one of the measured values to calculate the total flow demand of the evaporator $EVA-FLOW_{TOT}$.

In step 502, the processor 126 receives a measured outlet temperature $T_1$-$T_n$ of each evaporator tube bundle $112_1$ to $112_n$. The processor 126 then computes an outlet temperature setpoint $T_{EVA-SET}$ for the evaporator section 101 based on measured outlet temperatures of the plurality of evaporator tube bundles $112_1$ to $112_n$ (step 504). In step 506, the processor 126 compares the measured outlet temperature $T_n$ of the at least one evaporator tube bundle $112_n$ to a highest measured outlet temperature ($T_{MAX}$) among the plurality of evaporator tube bundles $112_1$ to $112_n$ to obtain a correction value $\Delta T_{CORR}$ for the outlet temperature $T_n$ of the at least one evaporator tube bundle $112_n$. In step 508, adjusts the outlet temperature setpoint $T_{EVA-SET}$ of the evaporator section 101 with respect to the measured outlet temperature $T_n$ of the at least one evaporator tube bundle $112_n$ to obtain an outlet temperature setpoint $T_{BUNDLE-SET-n}$ of the at least one evaporator tube bundle $112_n$. Namely the processor 126 adds the correction value $\Delta T_{CORR}$ associated with the at least one evaporator tube bundle $112_n$ to the outlet temperature setpoint $T_{EVA-SET}$ of the evaporator section 101 to obtain $T_{BUNDLE-SET-n}$. In step 510, the processor 126 adjusts the position of a control valve $114_n$ of the at least one evaporator tube bundle $112_n$ based on the adjusted temperature setpoint $T_{BUNDLE-SET-n}$ of the at least one evaporator tube bundle $112_n$.

Techniques consistent with the present disclosure provide, among other features, a system and method for controlling an outlet temperature of an evaporator having a plurality of evaporator tube bundles. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for controlling an outlet temperature of an evaporator having a plurality of evaporator tube bundles, comprising:
   receiving from a plurality of temperature sensors an outlet temperature measured at the outlet of each of the plurality of evaporator tube bundles;
   computing, via a processor, an outlet temperature setpoint for the evaporator, the outlet temperature setpoint being the average of the outlet temperatures measured at the respective outlet of each of the plurality of evaporator tube bundles;
   comparing, via the processor, the measured outlet temperature of each of the plurality of evaporator tube bundles to a highest outlet temperature measured among the plurality of evaporator tube bundles;
   computing, via the processor, an adjusted outlet temperature setpoint for the evaporator by adding a correction value to the outlet temperature setpoint, the correction value being the difference between the outlet temperature setpoint and the highest outlet temperature measured among the plurality of evaporator tube bundles; and
   adjusting, via the processor or processor controller, a position of a control valve of at least one of the plurality of evaporator tube bundles based on the adjusted outlet temperature setpoint to regulate fluid flow through the at least one of the plurality of evaporator tube bundles to reduce deviation between the outlet temperature of the at least one of the plurality of evaporator tube bundles and the outlet temperature setpoint of the evaporator.

2. The method of claim 1, further comprising multiplying the delta value by an amplification factor.

3. The method of claim 1, further comprising generating a valve control signal for each of the plurality of evaporator tube bundles.

4. The method of claim 3, further comprising:
   generating an initial position of the control valve of each of the plurality of evaporator tube bundles as a feed-forward signal which is a function of at least one of an input temperature and an input pressure of feed water to the evaporator, an output pressure of the evaporator, a characteristic of a respective control valve, and a ratio of a total flow demand of the evaporator to a total number of evaporator tube bundles of the plurality of evaporator tube bundles.

5. The method of claim 1 wherein when the correction value is above a predetermined threshold, the method further comprises multiplying the correction value by an amplification factor to stabilize a positioning of the control valve of at least one of the plurality of evaporator tube bundles.

6. A system for controlling an outlet temperature of an evaporator having a plurality of evaporator tube bundles, each evaporator tube bundle having a control valve, the system comprising:
   a controller having a processor and a memory for non-transitory storing a computer program which will configure the controller to:
   receive from a plurality of temperature sensors an outlet temperature measured at the outlet of each of the plurality of evaporator tube bundles;
   compute an outlet temperature setpoint for the evaporator, the outlet temperature setpoint being the average of the outlet temperatures measured at the respective outlet of each of the plurality of evaporator tube bundles;
   compare the measured outlet temperature of each of the plurality of evaporator tube bundles to a highest outlet temperature measured among the plurality of evaporator tube bundles;
   compute an adjusted outlet temperature setpoint for the evaporator by adding a correction value to the outlet temperature setpoint, the correction value being the difference between the outlet temperature setpoint and the highest outlet temperature measured among the plurality of evaporator tube bundles; and
   adjust a position of a control valve of at least one of the plurality of evaporator tube bundles based on the adjusted outlet temperature setpoint to regulate fluid flow through the at least one of the plurality of evaporator tube bundles to reduce deviation between the outlet temperature of the at least one of the plurality of evaporator tube bundles and the outlet temperature setpoint of the evaporator.

7. The system of claim 6, wherein the computer program will configure the controller to compute an initial valve position of at least one evaporator tube bundle of the plurality of evaporator tube bundles.

8. The system of claim 7, the system configured such that the initial valve position will be sent during operation to the at least one evaporator tube bundle of the plurality of evaporator tube bundles as a feed forward signal.

9. The system of claim 6, wherein the computer program will further configure the controller to regulate fluid flow through the evaporator based on an outlet steam temperature of a separator, and an outlet steam temperature of a steam superheating system.

10. The system of claim 6, in combination with the evaporator having a plurality of evaporator tube bundles, and the control valve of at least one evaporator tube bundle.

11. A controller for controlling an outlet temperature of an evaporator having a plurality of evaporator tube bundles, the controller comprising:
    a processor having a memory for non-transitory storing a computer program which will configure the processor to:
    receive from a plurality of temperature sensors an outlet temperature measured at the outlet of each of the plurality of evaporator tube bundles;
    compute an outlet temperature setpoint for the evaporator, the outlet temperature setpoint being the average of the outlet temperatures measured at the respective outlet of each of the plurality of evaporator tube bundles;
    compare the measured outlet temperature of each of the plurality of evaporator tube bundles to a highest outlet temperature measured among the plurality of evaporator tube bundles;

compute an adjusted outlet temperature setpoint for the evaporator by adding a correction value to the outlet temperature setpoint, the correction value being the difference between the outlet temperature setpoint and the highest outlet temperature measured among the plurality of evaporator tube bundles; and adjust a position of a control valve of at least one of the plurality of evaporator tube bundles based on the adjusted outlet temperature setpoint to regulate fluid flow through the at least one of the plurality of evaporator tube bundles to reduce deviation between the outlet temperature of the at least one of the plurality of evaporator tube bundles and the outlet temperature setpoint of the evaporator.

* * * * *